(12) United States Patent
Pfeiffer et al.

(10) Patent No.: US 7,513,033 B2
(45) Date of Patent: Apr. 7, 2009

(54) APPARATUS FOR WORKPIECE ASSEMBLY

(75) Inventors: Michael W. Pfeiffer, Savage, MN (US); Dennis R. Nielsen, Apple Valley, MN (US); Eric D. Johnson, Mpls, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 647 days.

(21) Appl. No.: 10/790,315

(22) Filed: Mar. 1, 2004

(65) Prior Publication Data

US 2005/0188534 A1 Sep. 1, 2005

(51) Int. Cl.
*B23P 19/00* (2006.01)
*B23P 21/00* (2006.01)

(52) U.S. Cl. .............................. 29/742; 29/430; 29/559; 29/33 J; 29/785; 29/791; 29/792; 29/281.4

(58) Field of Classification Search .................. 29/429, 29/430, 559, 33 J, 603.03, 737, 742, 783, 29/785, 791, 792, 281.4, 281.5, 799, 822, 29/823, 824
See application file for complete search history.

(56) References Cited

U.S. PATENT DOCUMENTS

| | | | | |
|---|---|---|---|---|
| 3,076,257 A | * | 2/1963 | Svenson | 29/888.025 |
| 3,088,198 A | * | 5/1963 | Svenson | 29/705 |
| 3,393,439 A | * | 7/1968 | Shriver | 29/823 |
| 3,706,122 A | * | 12/1972 | La Valle | 29/38 R |
| 4,173,824 A | * | 11/1979 | Wolfthal | 29/783 |
| 4,851,943 A | | 7/1989 | Perry | 360/105 |
| 4,862,584 A | | 9/1989 | Budy et al. | 29/704 |
| 5,150,512 A | | 9/1992 | Hatchett et al. | 29/603 |
| 5,377,815 A | * | 1/1995 | Vetter et al. | 198/476.1 |
| 5,465,476 A | | 11/1995 | Krajec et al. | 29/759 |
| 5,540,542 A | | 7/1996 | Krajec et al. | 414/751 |
| 5,826,325 A | | 10/1998 | Price et al. | 29/603.03 |
| 6,049,969 A | | 4/2000 | Jenkins et al. | 29/737 |
| 6,251,692 B1 | | 6/2001 | Hanson | 438/7 |
| 6,507,992 B1 | | 1/2003 | Jenkins et al. | 29/603.03 |
| 6,629,690 B1 | | 10/2003 | Viens | 270/58.01 |
| 6,834,425 B2 | * | 12/2004 | Budig et al. | 29/791 |
| 2003/0182795 A1 | * | 10/2003 | Budig et al. | 29/792 |

* cited by examiner

*Primary Examiner*—Jermie E Cozart
(74) *Attorney, Agent, or Firm*—Westman, Champlin & Kelly, P.A.

(57) ABSTRACT

An apparatus for workpiece assembly is disclosed. In the illustrated embodiment, the apparatus includes a carousel which rotates between a plurality of assembly stations for assembly. Workpieces are loaded onto or unloaded from the carousel at a load/unload station and the carousel rotates to position workpieces proximate to the plurality of assembly stations. As illustrated workpieces are loaded into a plurality of assembly nests on the carousel. The plurality of assembly nests include alignment fingers rotatable with the plurality of assembly nests or carousel to align components, for example to align discs of a hydrodynamic spindle assembly for merge operations.

26 Claims, 16 Drawing Sheets

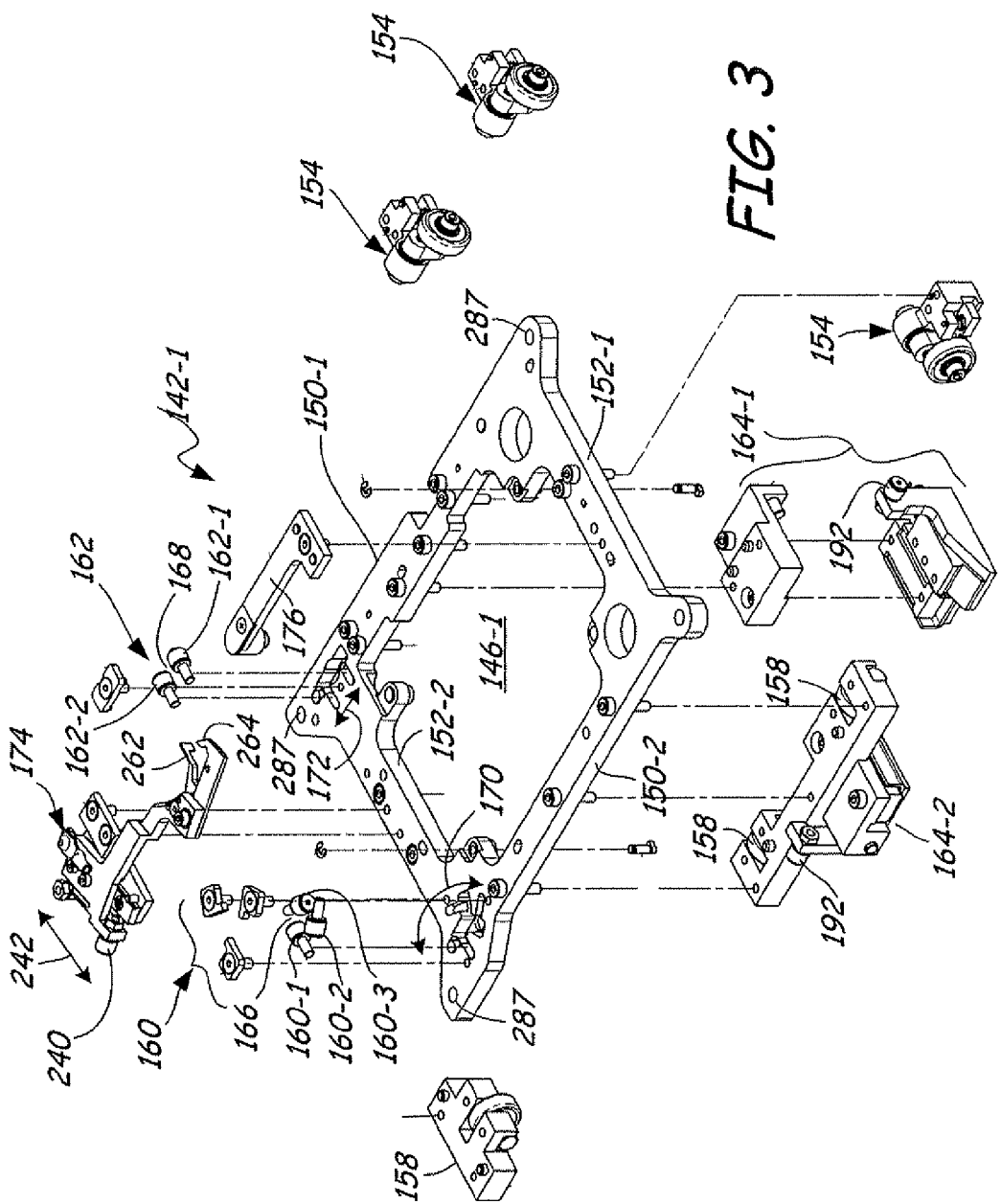

APPARATUS FOR WORKPIECE ASSEMBLY

FIELD OF THE INVENTION

The present invention relates generally to an assembly apparatus, and more particularly but not by limitation to an assembly apparatus for automated assembly of a workpiece or device.

BACKGROUND OF THE INVENTION

Automated assembly systems can employ multiple automated process steps to assemble a workpiece or device. Assembly systems can perform multiple processes or assembly steps at a single position or station or multiple stations. For assembly at a single position, the workpiece is aligned for multiple process or assembly steps which provides advantages over multiple alignment steps to assure proper assembly of the workpiece or device. Complex assembly processes require complex assembly sequences which typically require additional space which can restrict single position assembly or conveyor assembly. Embodiments of the present invention provide solutions to these and other problems, and offer other advantages over the prior art.

SUMMARY OF THE INVENTION

The present invention relates to an apparatus for workpiece assembly. In the illustrated embodiment, the apparatus includes a carousel which rotates between a plurality of assembly stations for assembly. Workpieces are loaded onto the carousel and unloaded from the carousel at a load/unload station and the carousel rotates to position workpieces proximate to the plurality of assembly stations. As illustrated workpieces are loaded into a plurality of assembly nests on the carousel. The plurality of assembly nests include alignment fingers rotatable with the plurality of assembly nests or carousel to align components for assembly operations. Other features and benefits that characterize embodiments of the present invention will be apparent upon reading the following detailed description and review of the associated drawings.

BRIEF DESCRIPTION OF THE DRAWINGS

FIG. 3 illustrates an embodiment of a nest plate (shown exploded) of an assembly nest for an assembly apparatus.

FIGS. 10-1 through 10-4 illustrate an embodiment of a merge tool for merging head suspension assemblies of a data storage device.

DETAILED DESCRIPTION OF ILLUSTRATIVE EMBODIMENTS

Figure 1:
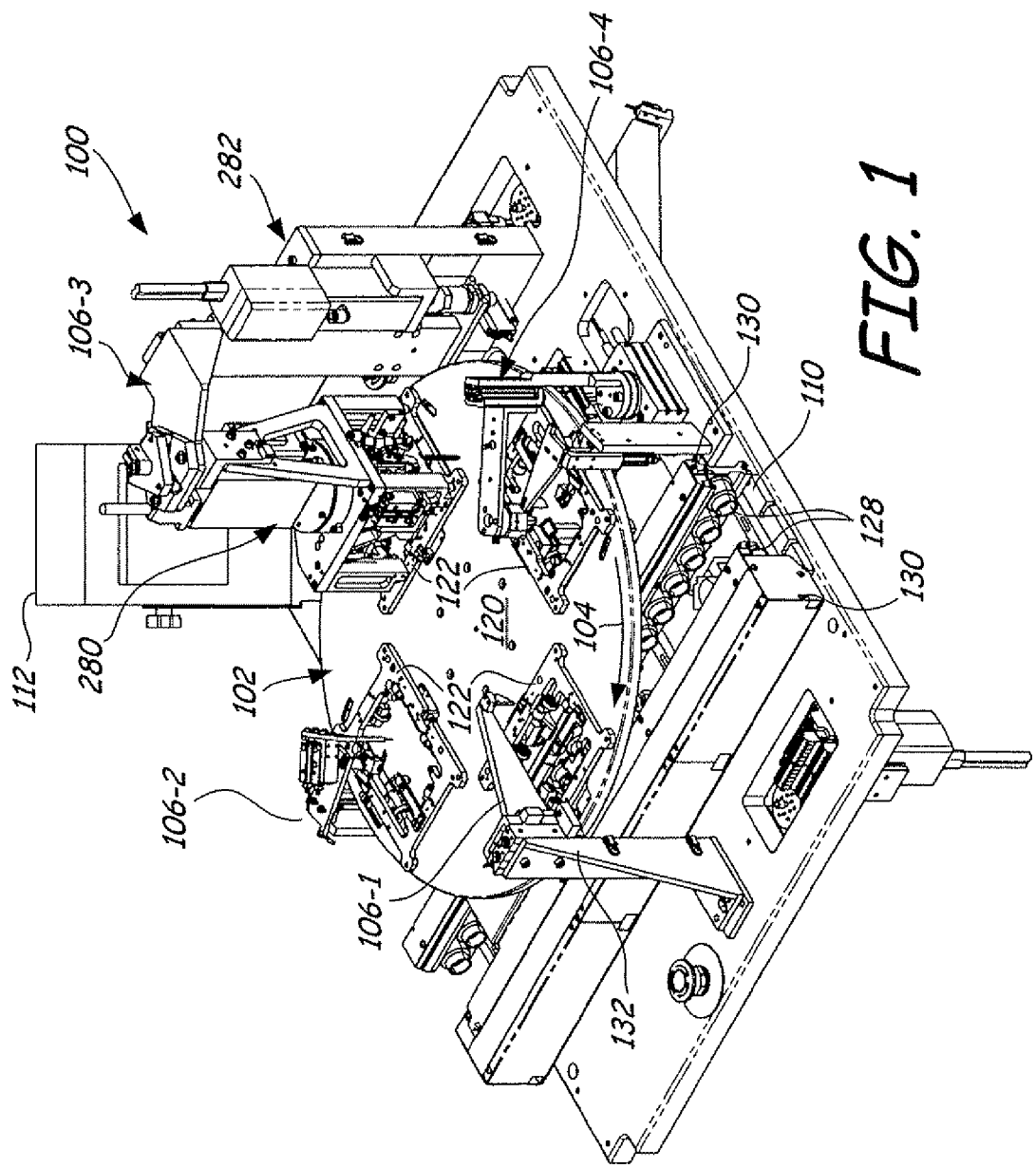
FIG. 1 illustrates an embodiment of an assembly apparatus including a rotatable carousel.

FIG. 1 illustrates an apparatus 100 for assembling components of a workpiece or device. As shown the apparatus includes an assembly carousel 102 rotatable as illustrated by arrow 104 from a load/unload station 106-1 to assembly stations which in the illustrated embodiment include assembly stations 106-2, 106-3, 106-4. A workpiece (not shown) is loaded onto the assembly carousel 102 from a conveyor 110 at the load/unload station 106-1. Carousel 102 is then rotated as illustrated by arrow 104 relative to the assembly stations 106-2, 106-3, 106-4 for assembly operations for the workpiece. Although a particular number of assembly stations is shown in the illustrated embodiment, application is not limited to the particular embodiment shown. In the illustrated embodiment, the apparatus includes ionizer 112 to control electro-static discharge for data storage application.

Figure 2:
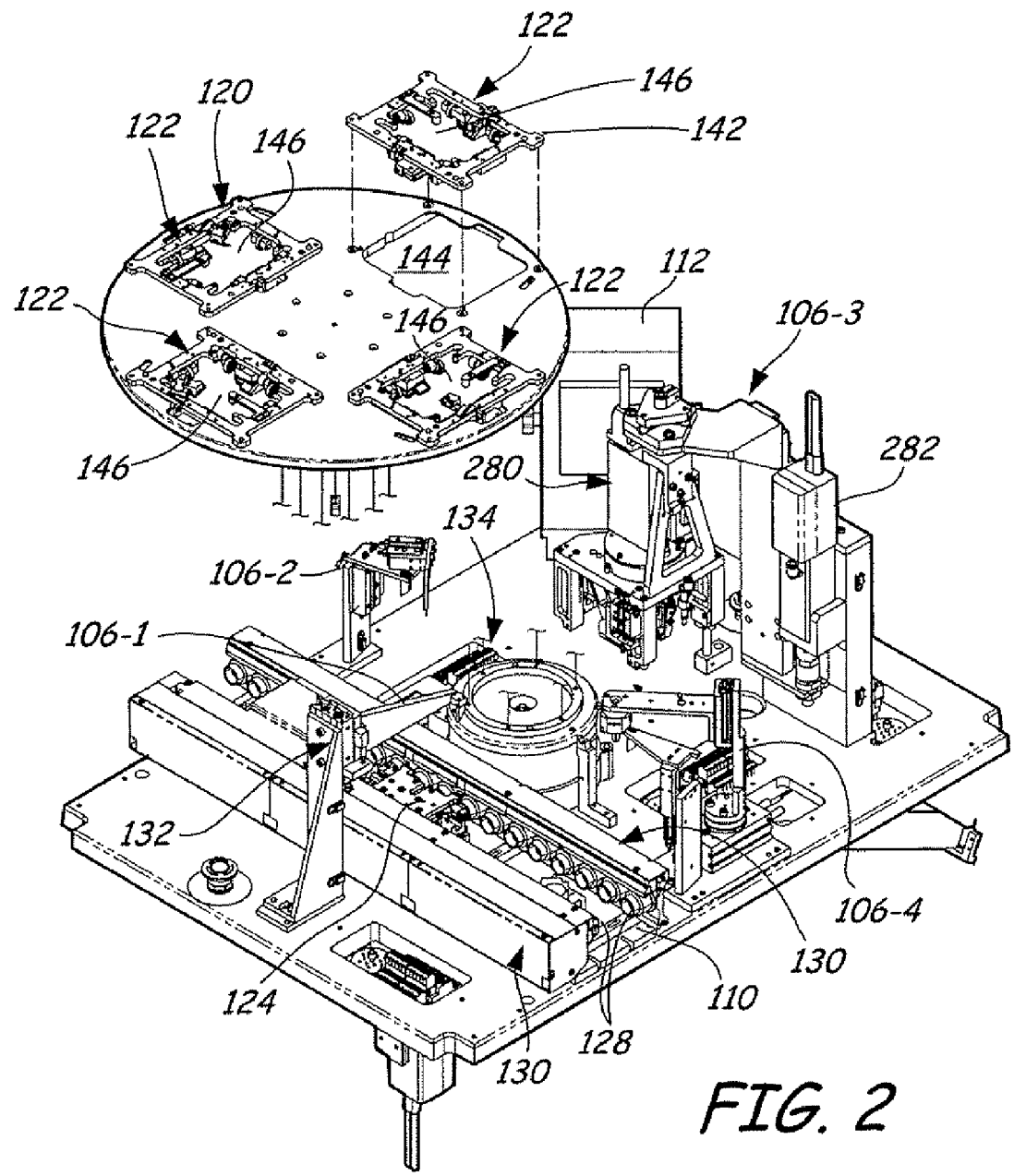
FIG. 2 illustrates an embodiment of the assembly apparatus of FIG. 1 with a carousel portion exploded from the assembly.

As shown in FIGS. 1-2, carousel 102 includes carousel plate 120 having a plurality of assembly nests 122 spaced thereabout. A workpiece is loaded into one of the assembly nests 122 of the carousel 102 from conveyor 110 via a lift assembly 124 operable in a gap between rollers 128 along spaced rails 130 of the conveyor 110. Lift assembly 124 is energized to raise and lower the workpiece or device from the conveyor 110 to the carousel 102. Workpieces are loaded into the assembly nests 122 at the load/unload station 106-1 and are secured into the nest 122 via a latch cam assembly 132. Thereafter, carousel plate 120 or carousel 102 rotates via motor 134 as shown in FIG. 2 to move nests 122 from the load/unload station 106-1 to assembly stations 106-2, 106-3, 106-4 along a carousel path. In the illustrated embodiment, the assembly nest 122 includes a nest plate 142 secured proximate to openings 144 of the carousel plate 120 to form a nest cavity 146 into which the workpiece is loaded at the load/unload station 106-1. Nest plates 142 are removable coupled to the carousel plate 120 to accommodate different workpiece configurations or dimensions.

Assembly Nest (122)

Figures 1, 10:
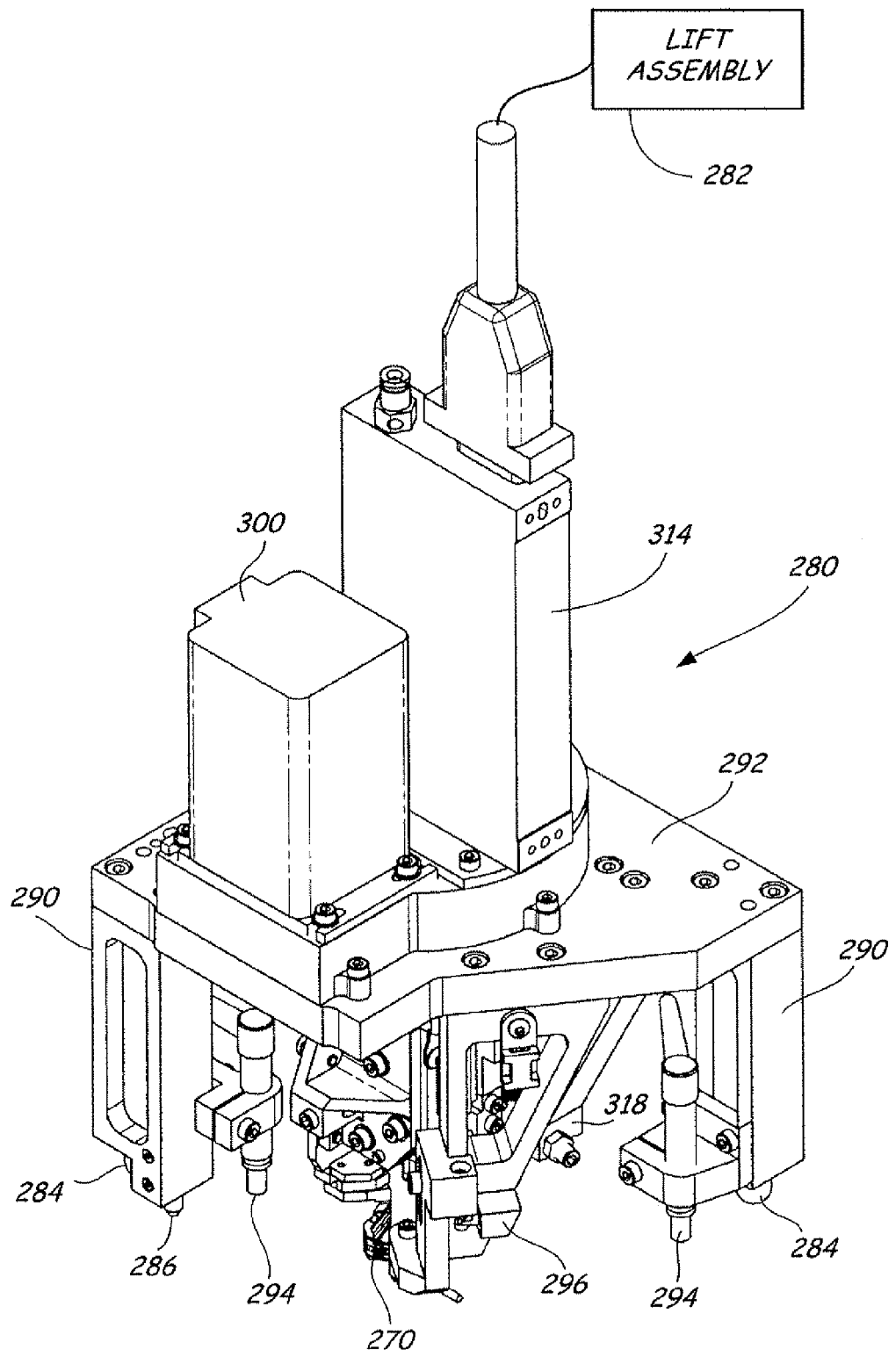
Figures 2, 10:
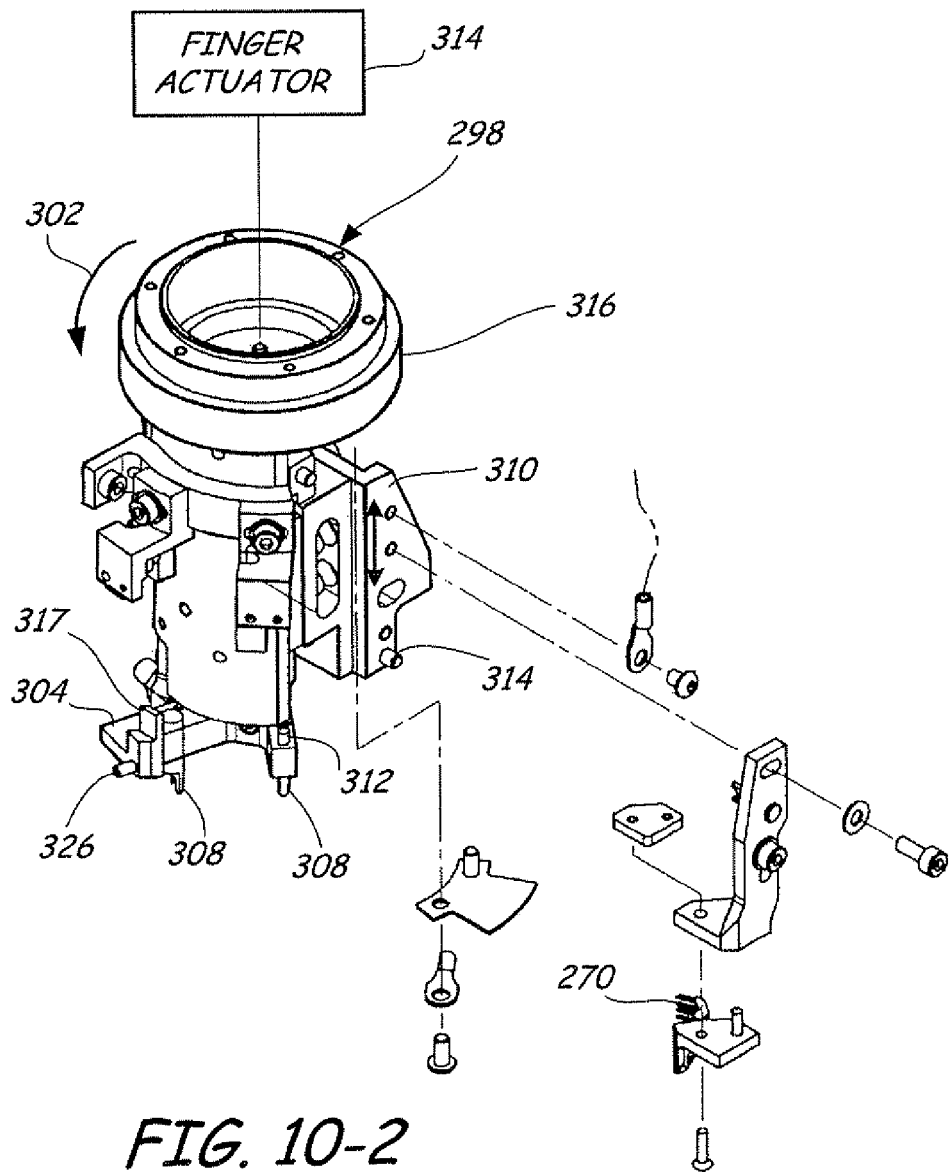
Figures 3, 10:
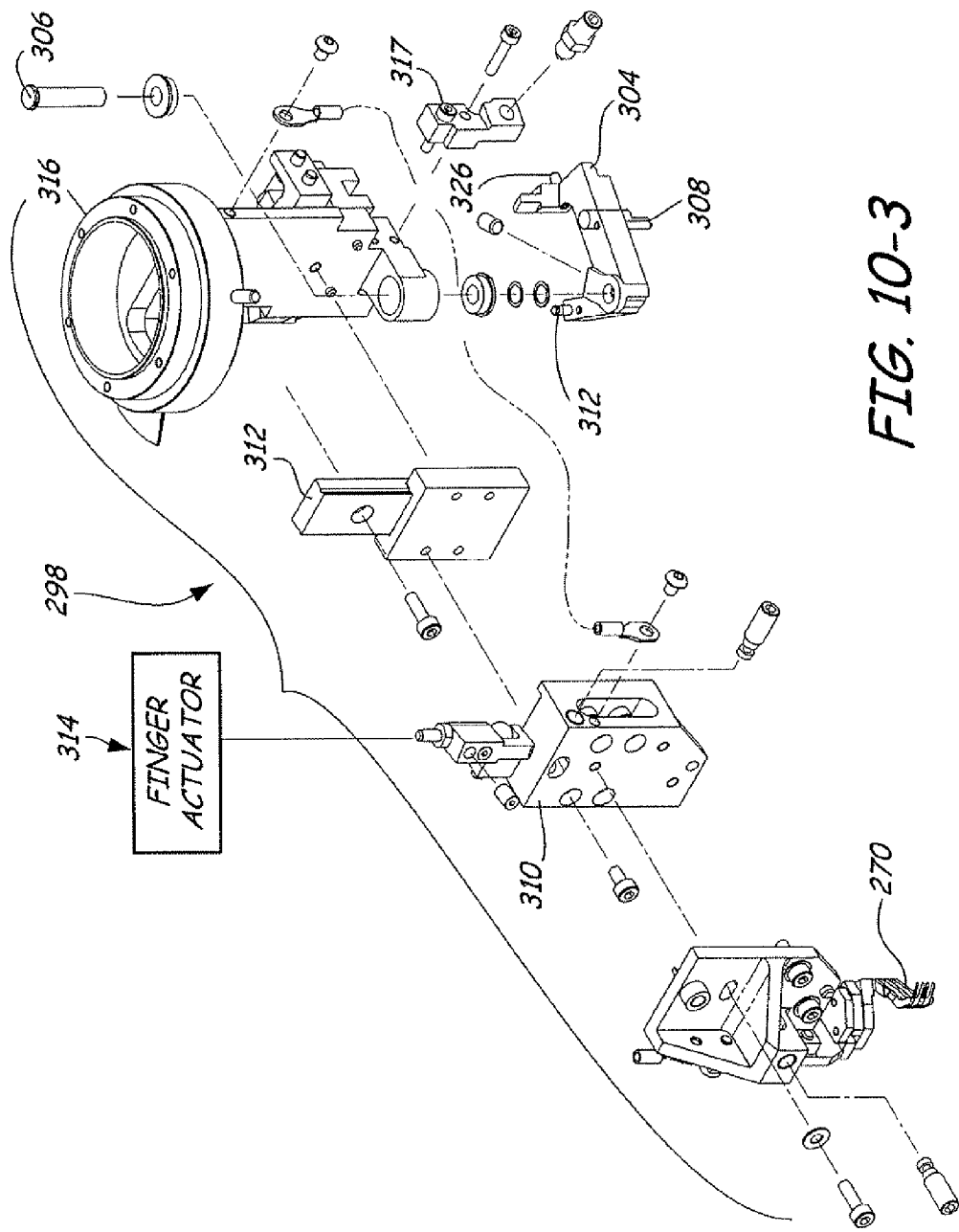
Figures 4, 10:
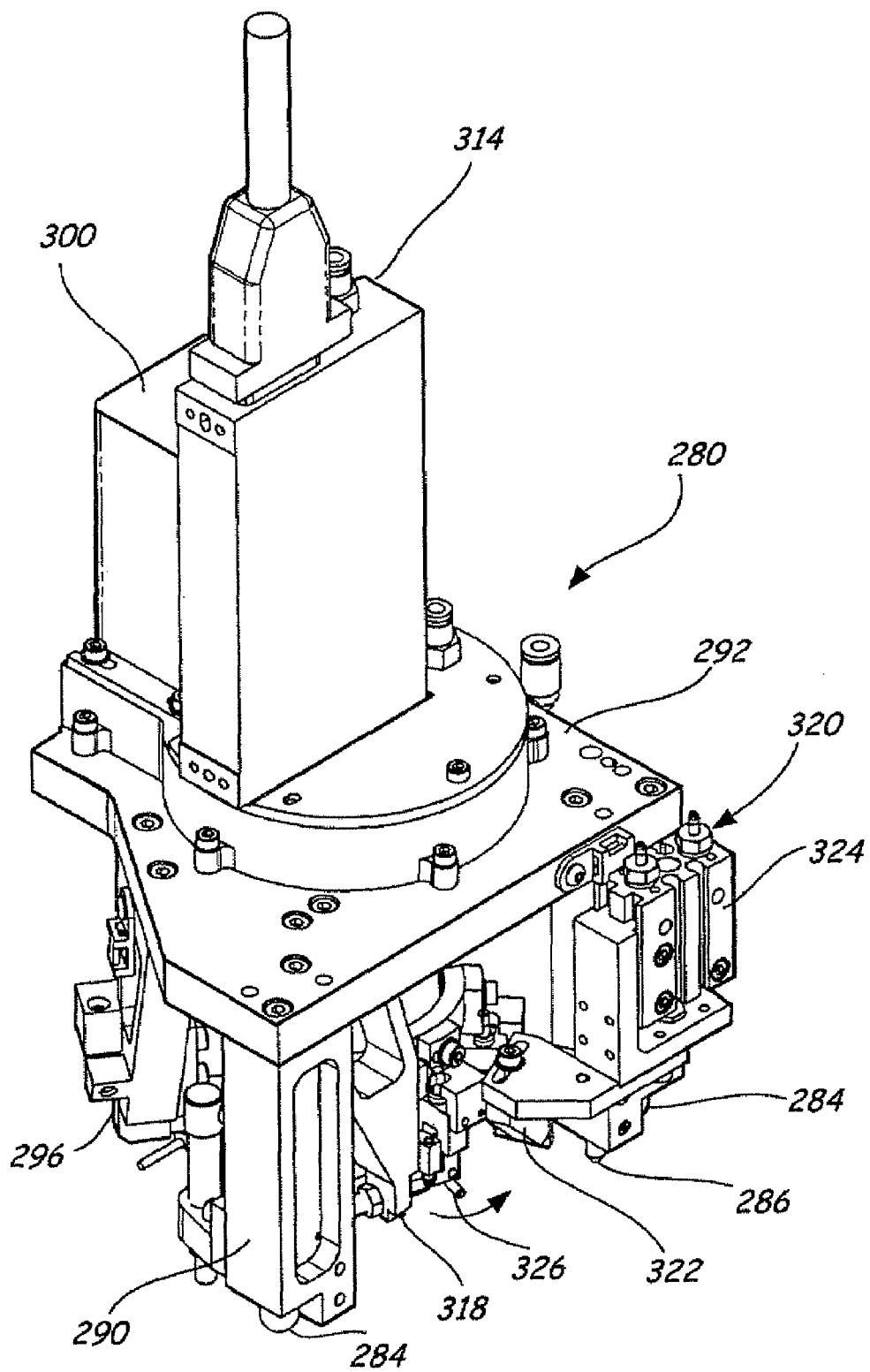

FIG. 3 is an exploded view illustrating an embodiment of the nest plate 142-1 which forms the assembly nest 122 and cavity 146-1. As shown, the nest plate 142-1 includes a plate body having opposed sides 150-1, 150-2 and opposed ends 152-1, 152-2. The plate 142-1 includes spring loaded bearings or rollers 154 along side 150-1 and end 152-1 of the nest plate 142-1 and fixed bearings or rollers 158 along sides 150-2 and end 152-2 to align a workpiece in the nest cavity 146-1 via roller datum blocks 160, 162. A workpiece is secured into the cavity via latches or clamps 164-1, 164-2 along sides 150-1, 150-2. Roller datum block 160 includes rollers or bearings 160-1, 160-2 and 160-3 arranged to provide a rotational datum socket 166 thereon for rotation alignment and roller datum block 162 includes roller or bearings 162-1, 162-2 to provide an axial datum socket 168 therebetween spaced from the rotation datum socket 166. A workpiece is rotationally adjustable relative to rotational datum socket 166 as illustrated by arrow 170 and axially adjustable relative to axial datum socket 168 as illustrated by arrow 172 to cooperatively provide (x, y, Θ) alignment for an assembly head or assembly device as will be described. As shown, nest plate 142-1 also includes positioning or clocking arm 174 and biasing finger 176 to preposition the workpiece or components for carousel assembly operations.

Latch Cam Assembly (132)

Figure 4:
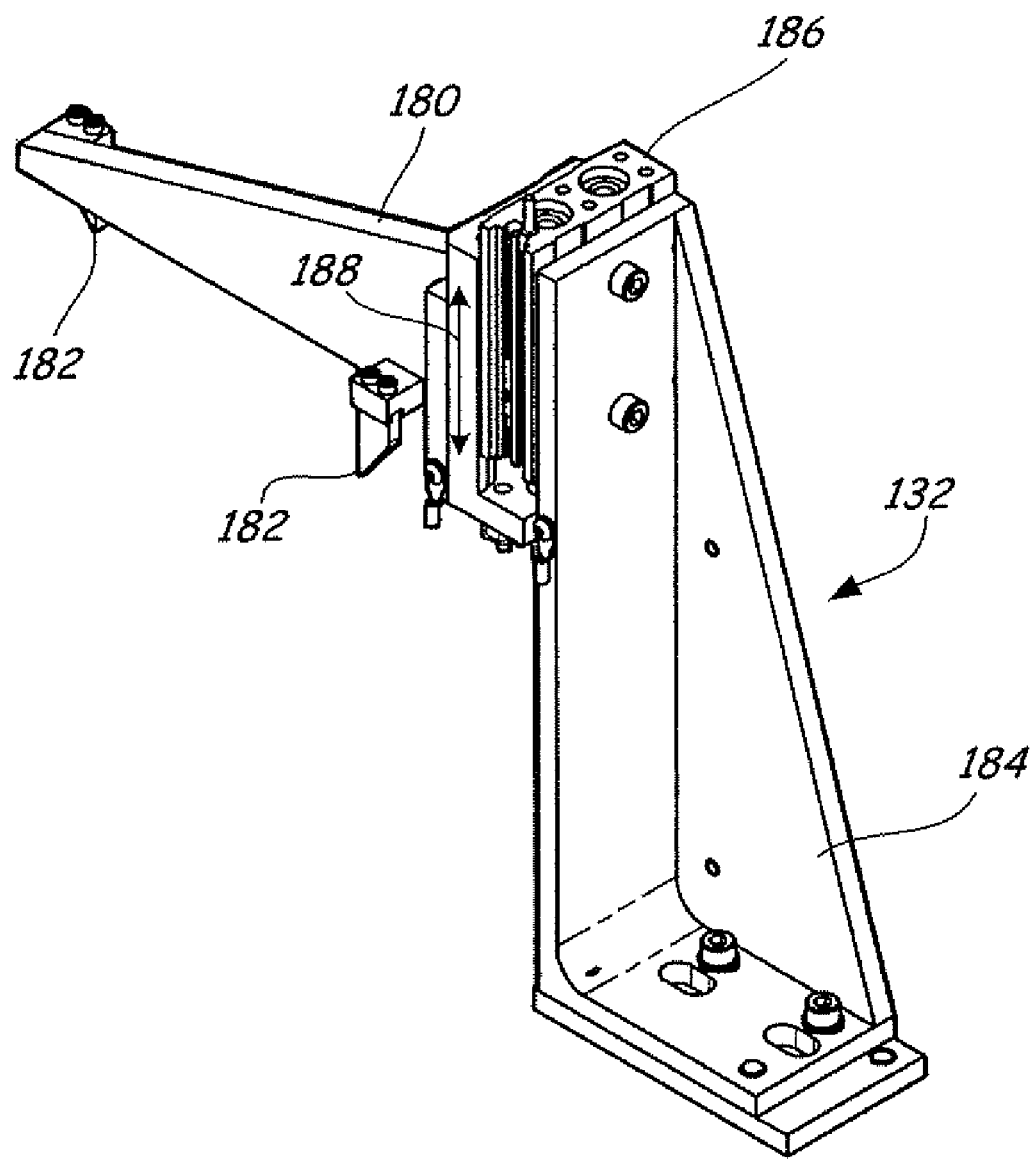
FIG. 4 is a detailed illustration of a latch cam assembly as shown in FIG. 1.

As previously described, workpieces are secured in the assembly nests 122 via the latch cam assembly 132 (as previously shown in FIGS. 1-2) which in the embodiment illustrated in FIG. 4 includes an arm 180 having latch cam fingers 182 operable to retract latches 164-1, 164-2 on the nest plate, which are normally biased in an extended latched position to load a workpiece into the assembly nest 122. As shown in FIG. 4, the arm 180 is moveably supported relative to post 184 via actuator 186 as illustrated by arrow 188 to lower latch cam fingers 182 which are spaced to engage cam bearings 192 (as illustrated in FIG. 3) coupled to the latches 164-1, 164-2 to retract the latches 164-1, 164-2 against the spring bias to release or load a workpiece. Thus, for load operations, the cam fingers 182 are lowered toward the latches 164-1, 164-2 to release or retract the latches 164-1, 164-2 and the lift assembly 124 is raised to position a workpiece into the assembly nest 122 (e.g. nest cavity). Thereafter the cam fingers 182 are raised to release the spring biased latches 164-1, 164-2 to secure the workpiece in the assembly nest. Lift assembly 124 is then lowered or retracted from the carousel 102 and the carousel 102 is rotated for assembly operations.

Carousel Merge

Figure 5:
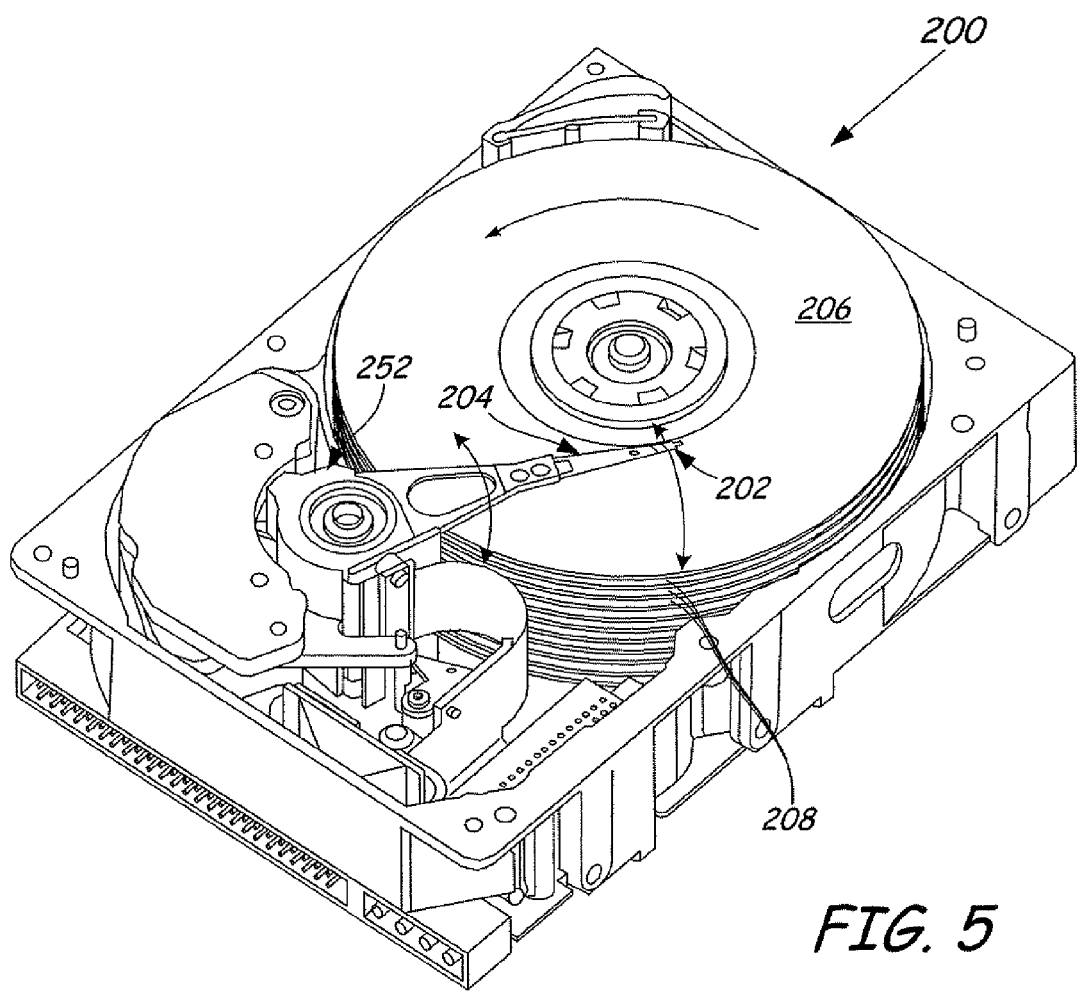
FIG. 5 illustrates a data storage device including a plurality of head suspension assemblies and discs.

For assembly of a data storage device 200 as illustrated in FIG. 5, heads 202 or head suspension assemblies 204 are merged relative to discs 206 (or plurality of discs of a disc stack). The plurality of discs 206 are spaced to form a gap or gaps 208 between adjacent discs. For merge operations, head suspension assemblies 204 must be aligned with the gap 208 to merge the head suspension assemblies 204 and discs 206. The illustrated carousel assembly includes a plurality of stations for automated carousel merge of head suspension assemblies 204 and discs 206 of a data storage device or workpiece.

For operation, data storage workpieces are sequentially loaded and unloaded into the assembly nests 122 at the load unload station 106-1. The biasing finger 176 of nest 122 is positioned to tip or bias the discs 206 to provide a biased orientation or alignment for the discs which in the illustrated embodiment are supported by a hydraulic or hydrodynamic spindle motor or assembly. The finger 176 includes a spring loaded tip portion which engages or contacts a spindle or spindle motor proximate to a spindle or disc clamp to provide a tipping or biasing force to align gaps 208 of a disc stack or discs relative to the head suspension assemblies 204. In the carousel embodiment illustrated in FIG. 1, the carousel includes a premerge station 106-2, a merge station 106-3 and a post merge station 106-4 to merge head suspension assemblies relative to discs 206 as described below.

Premerge Station (106-2)

Figure 6:
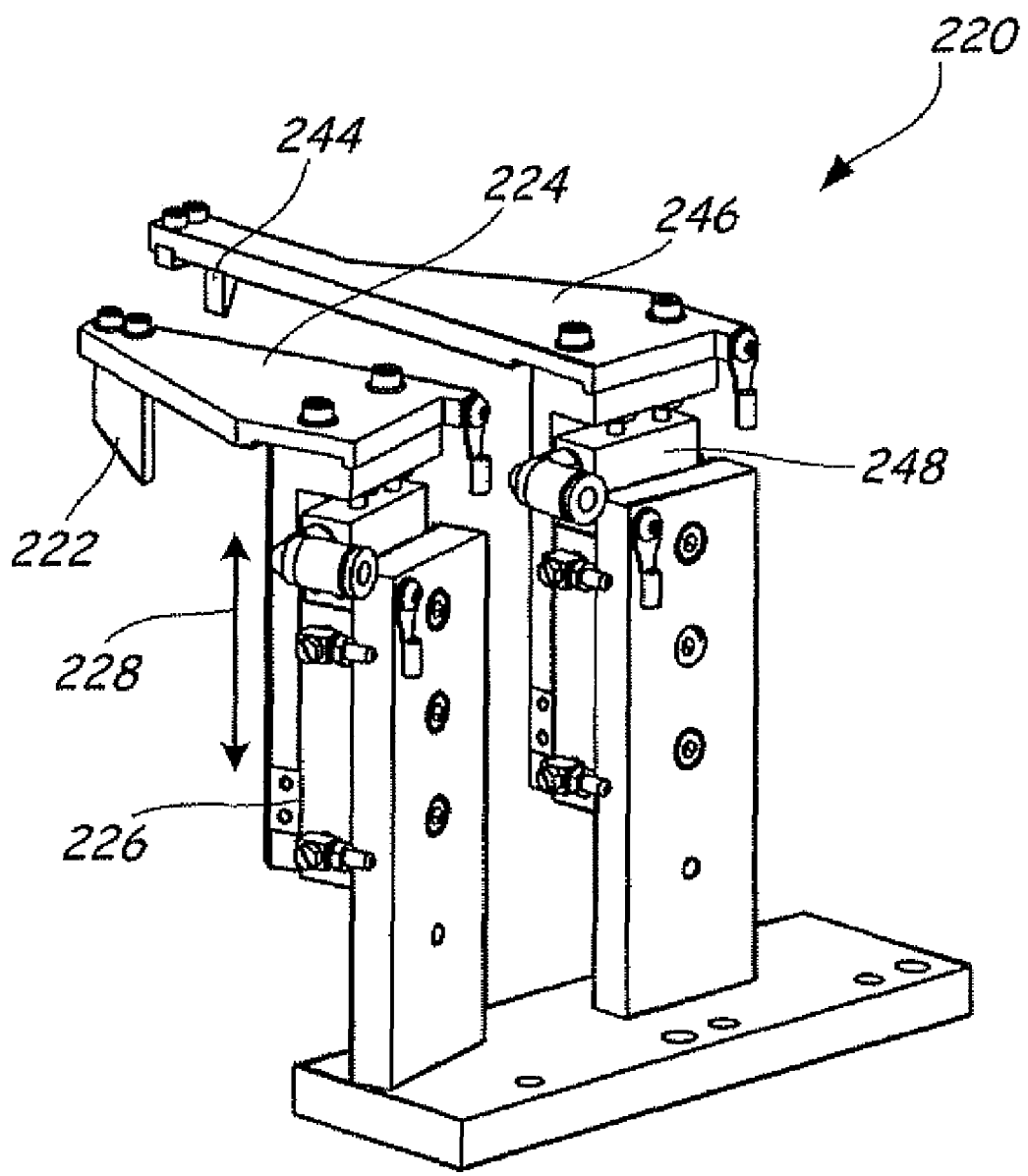
FIG. 6 illustrates a pre-merge cam assembly for carousel merge operations.

As shown in FIG. 6, the pre-merge station 106-2 includes a pre-merge cam assembly 220 which includes a suspension cam finger 222 which interfaces with or engages the positioning or clocking arm 174 on the assembly nest 122 to position the head suspension assemblies or workpiece for merge operation. The suspension cam finger 222 is coupled to arm 224 which is movably supported between a raised position and a lowered position proximate to the positioning or clocking arm 174 (on the assembly rest) via actuator 226 as illustrated by arrow 228.

Actuator 226 is energized to lower or move the suspension cam finger 222 to engage or contact bearing 240 (as shown in FIG. 3) coupled to the positioning or clocking arm 174 to move the positioning or clocking arm 174 as illustrated by arrow 242 to place or locate the positioning or clocking arm 174 relative to the head suspension assembly or assemblies for merge operations. In the illustrated embodiment, the pre-merge cam assembly 220 includes a latch cam finger 244 coupled to arm 246 which is energized via actuator 248 to lower or position (as illustrated by arrow 228) the latch cam finger 244 to release a suspension latch assembly for pre-merge operation as will be explained.

Figure 7:
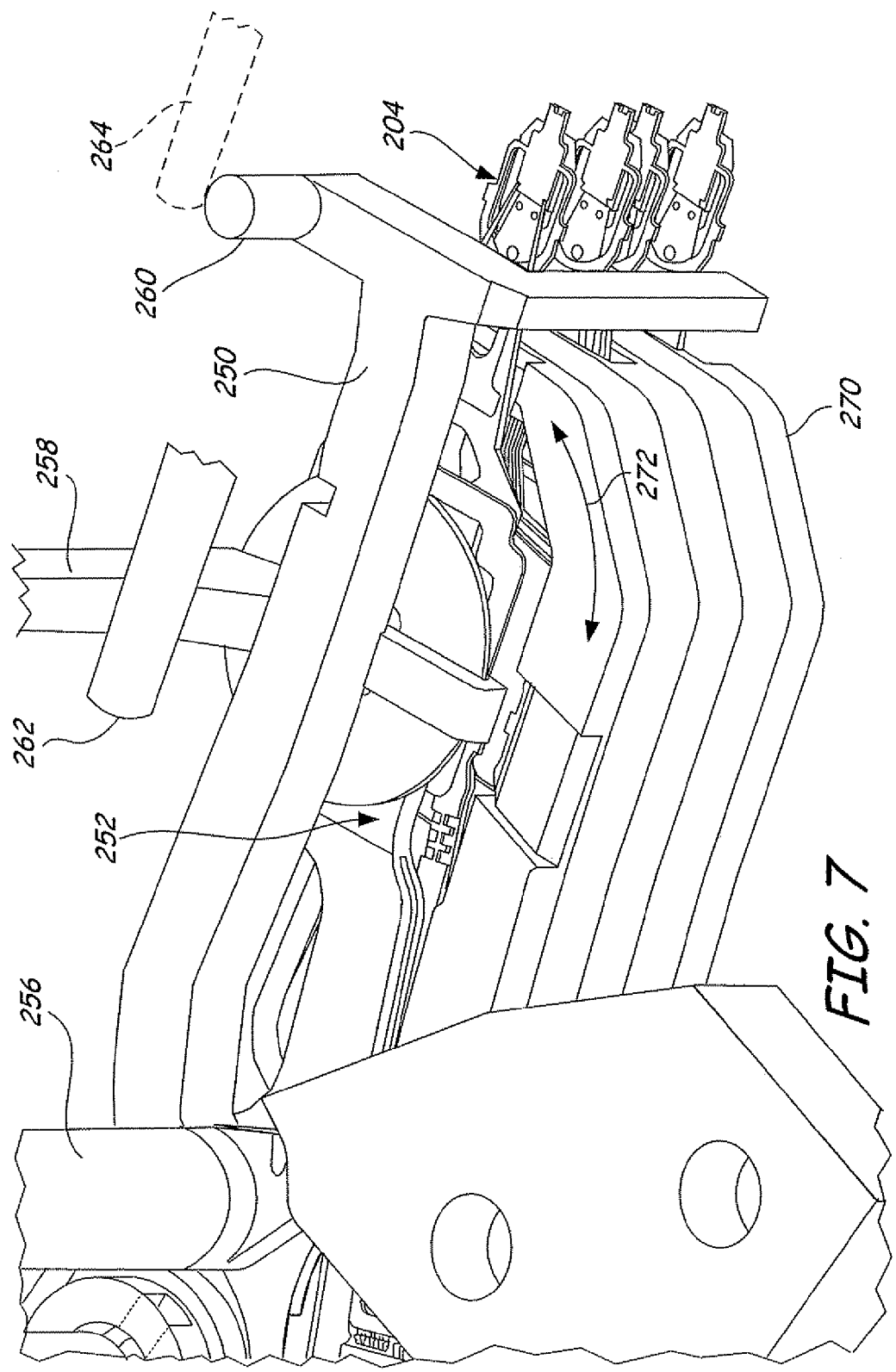
FIG. 7 is an illustrative embodiment of head suspension assemblies and comb therefor and merge or spreader fingers.
Figure 8:
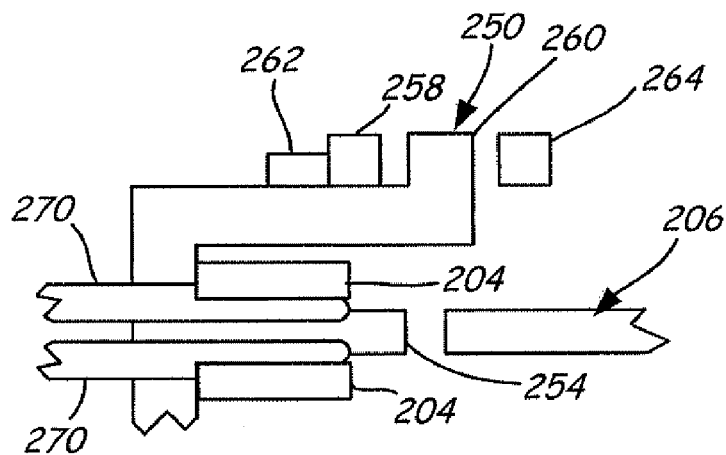
FIG. 8 illustrates an elevational view of an interface of nest fingers and merge or spreader fingers relative to head suspension assemblies and the comb of FIG. 7.

As shown in FIGS. 7-8, prior to merge operation a suspension comb 250 is assembled relative to suspension assemblies 204 of an actuator or E-block 252. In the illustrated embodiment, the comb 250 includes a plurality of teeth 254 (only one shown in FIG. 8) which are interspersed relative to the head suspensions assemblies 204 to protect the head suspension assemblies 204 from damage. The comb 250 includes a comb post 256 and comb fingers 258 and 260. The positioning or clocking arm 174 includes nest fingers 262, 264 as shown in FIG. 3. The suspension cam finger 222 of the pre-merge cam assembly 220 of FIG. 6 is activated to position the nest fingers 262, 264 proximate to the comb fingers 258, 260 (as illustrated in phantom in FIG. 7) to bias or align the head suspension assemblies 204 for merge operations. Nest finger 262 is positioned aft of the comb finger 258 to bias the head suspension assembly or assemblies proximate to the disc or discs 206 as shown in FIGS. 7-8 and nest finger 264 is positioned forward of the comb finger 260 to provide a backstop relative to the comb 250.

Figure 9:
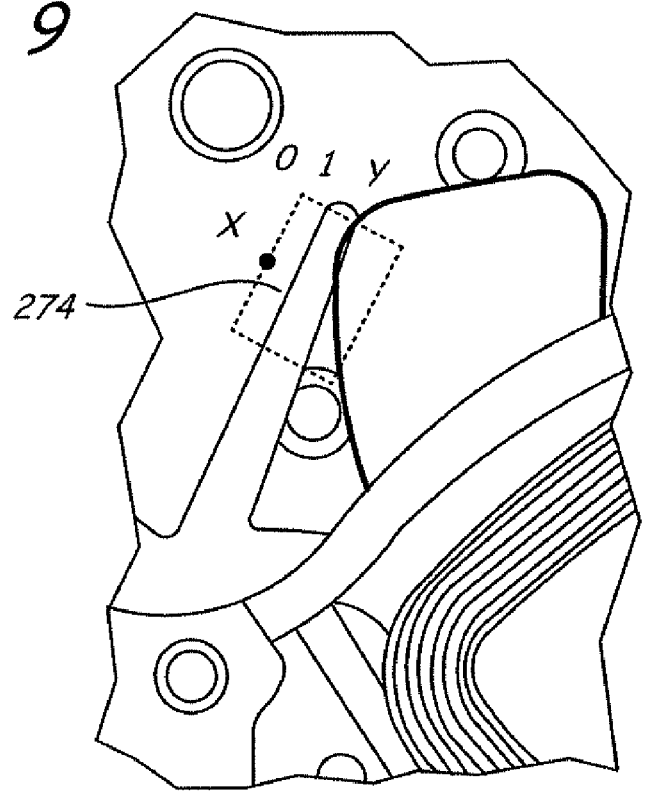
FIG. 9 illustrates an embodiment of a latch assembly for head suspension assemblies of a data storage device.

For merge operations merge fingers or spreaders 270 as shown in FIGS. 7-8 are positioned proximate to head suspension assemblies 204 and rotated as illustrated by arrow 272 to merge the head suspension assembly 204 relative to the discs 206. Merge fingers or spreaders 270 are sloped or ramped to engage or slide under the head suspension assemblies. As shown in FIG. 9, the workpiece includes a head suspension assembly latch 274 to provide a locked or non-operation position for the head suspension assemblies. For merge operations the head suspension assembly latch 274 is released via operation of the latch cam finger 244 of the pre-merge cam assembly 220 as previously shown in FIG. 6 prior to merge operations at the premerge station 106-2.

Merge Station (106-3)

Merge fingers or spreaders 270 are supported relative to a merge tool 280 at merge station 106-3 as shown in FIGS. 1-2. The merge tool 280 as shown in detail in FIGS. 10-1 through 10-4 is compliantly (relative to six degrees of freedom) supported by a lift assembly 282 to raise and lower the merge tool 280 relative to the data storage device or workpiece for merge operations. The merge tool 280 includes nest balls 284 and pins 286, which extend from legs 290 coupled to a merge plate 292 of the merge tool 280. In a lower merged position of the merge tool 280, the nest balls 284 seat in ball pads 287 on the assembly nest as shown in FIG. 3 to provide elevational alignment or planarity for the merge tool 280 relative to the assembly nest. Pins 286 (only one visible in FIG. 10-1) are aligned for insertion into datum sockets 166, 168 as previously illustrated in FIG. 3 to orient or self align the compliantly supported merge tool 280 relative to the assembly nest and the workpiece. The merge tool 280 includes displacement sensors 294 on legs 290 for alignment of the merge tool 280 and sensor block 296 to provide position feedback (e.g. disc height or placement of the discs to align the merge fingers 270 relative to discs) for operation of the merge tool.

Merge fingers or spreaders 270 are coupled to a rotatable merge head 298 which rotates via motor 300 as illustrated by arrow 302 as illustrated in FIG. 10-2 to merge head suspension assemblies 204 relative to the discs 206. As shown in FIG. 10-2, the rotatable merge head 298 includes a yoke portion 304 pivotably coupled to the merge head 298 via bearing 306 as shown in FIGS. 10-2 and 10-3. The yoke portion 304 includes yoke pins 308 on spaced yoke arms which are spaced to abut opposed sides of the actuator or E-block 252 or head suspension assemblies (e.g. yoke portion of a voice coil motor) when the merge head 298 is lowered relative to the assembly nest. As shown in FIG. 10-2, the spreaders or merge fingers 270 of the merge head are coupled to a merge block 310 moveable relative to the merge head (along track 312) via finger actuator 314 to raise and lower merge fingers or spreaders 270 relative to the discs and head suspension assemblies. Placement of the merge block 310 (or merge finger or spreader 270) is controlled via feedback from the sensor block 296

Merge head 298 is rotatably coupled to the merge tool via spindle 316. Rotation of the spindle 316 rotates merge fingers or spreaders 270 and yoke portion 304 to rotate the head suspension assemblies for merge operations. Rotation of the merge fingers or spreaders 270 as previously illustrated rotates head suspension assemblies into gaps 208 between discs relative to comb 250 which is biased against movement (via interface with discs) to merge the head suspension assemblies. A rotation stroke of the merge head 298 and merge fingers 270 is controlled via a stop block 317 on the merge head relative to a stop arm 318 on the merge tool as shown in FIG. 10-4.

Once the head suspension assembly or assemblies 204 are merged, merge fingers 270 are withdrawn via counter rotation of the merge head 298. As the merge fingers 270 are withdrawn, nest finger 262 biases comb 250 relative to comb finger 258 to restrict withdrawal thereof with removal of the merge fingers 270. Merge fingers or spreaders 270 are withdrawn from the merged head suspension assemblies 204 without rotation of the yoke portion 304 to maintain the position of the yoke pins 308 relative to a merged position of the actuator or E-block 252 or head suspension assemblies following merge operations.

As previously described, the yoke portion 304 is pivotally coupled to the merge head 298 and is spring biased towards the merge block 310 between pins 312 (on yoke) and 314 (on merge block 310) to provide a normally biased position of the yoke portion 304 relative to the merge head 298. The merge tool 280 includes a yoke latch assembly 320 as illustrated in FIG. 10-4 to restrict rotation of the yoke portion 304 as the merge head 298 rotates to withdraw the merge fingers 270 following merge operations. The yoke latch assembly 320 includes a yoke cam 322 coupled to actuator 324 which is energized to move or lower yoke cam 322 to engage or contact pin 326 on the yoke portion 304. The yoke cam 322 restricts or inhibits rotation of the yoke portion 304 as the merge fingers or spreaders 270 are withdrawn following completion of the merge operation. Following completion of the merge stroke, the merge tool 280 is raised via the lift assembly 282 and thereafter the yoke cam 322 is released and the yoke portion 304 is released to a biased position (via the spring bias) relative to the merge block 310 for subsequent merge operations.

Post Merge Station/Completion (106-4)

Figure 11:
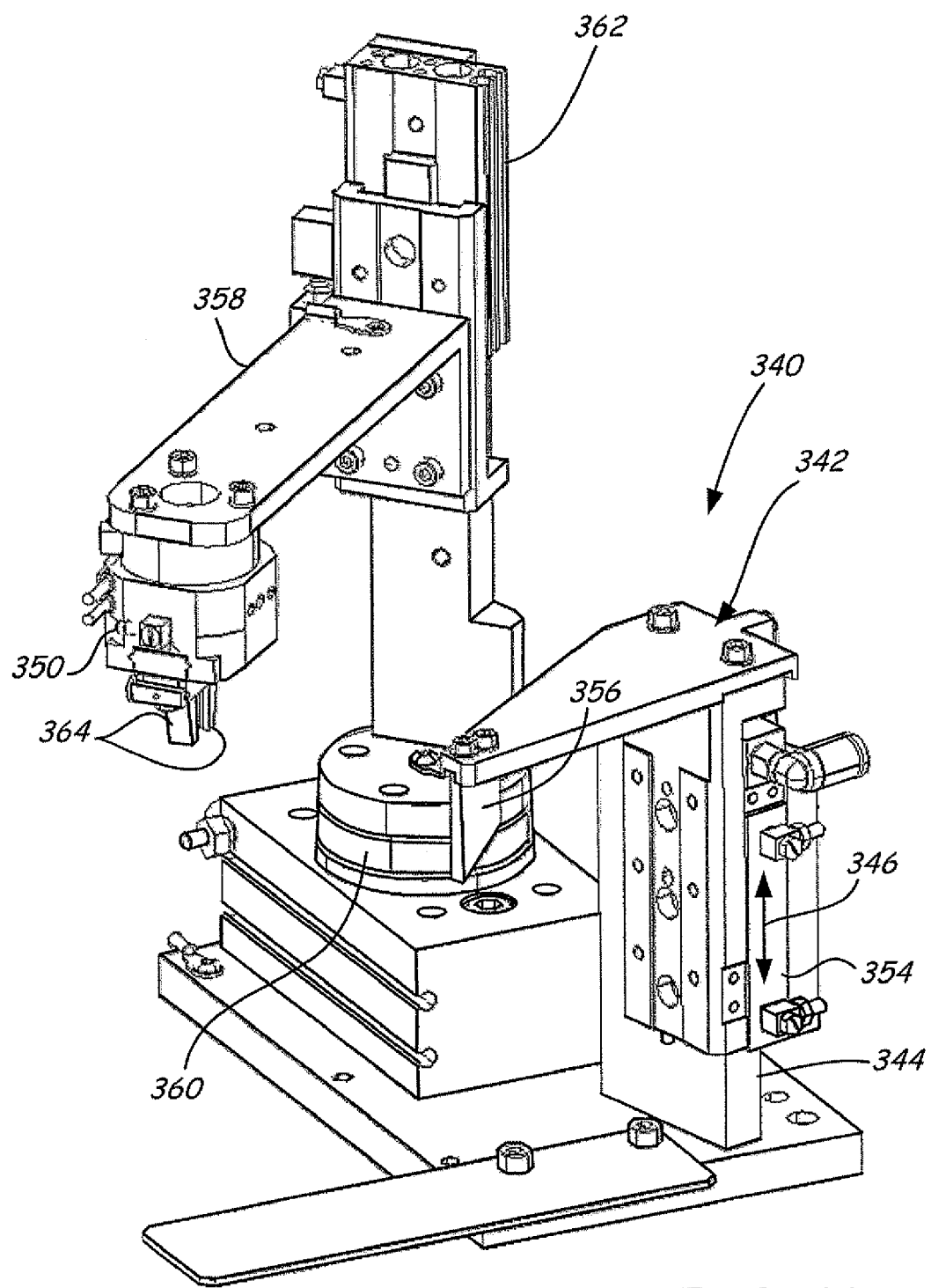
FIG. 11 illustrates an embodiment of a post-merge cam and gripper head to remove a comb from merged head suspension assemblies.

In the illustrated embodiment, carousel merge operations include a merge completion at station 106-4 for removal of the preassembled comb 250. In the illustrated embodiment, carousel 102 is rotated to station 106-4 proximate to removal assembly 340 as illustrated in FIG. 11. As shown in FIG. 11 assembly 340 includes a post-merge cam 342 moveably supported relative to post 344 as illustrated by arrow 346 and a gripper head 350 to grip and remove the comb 250. For operation post-merge cam 342 is lowered via actuator 354 to bias finger 356 relative to bearing 240 (as shown in FIG. 3) on the positioning arm 174 as shown in FIG. 1 to release the positioning or clocking arm 174 of the assembly nest 122 from the merged assembly.

Gripper head 350 is supported by arm 358 which is movably coupled to table 360. Table 360 rotates to position the gripper head 350 proximate to the comb 250. The gripper head 350 is lowered via actuator 362 coupled to arm 358. Gripping head 350 includes gripper fingers 364 which are operable between an opened position and a closed position to engage the comb 250. After the comb 250 is removed, the gripper head 350 is retracted or raised via actuator 362 and the gripper head 350 is rotated via table 360 to release the comb 250 proximate to a collection site. Preferably gripper fingers 364 are pneumatically actuated between the opened and closed positions to engage and release the comb 250 following merge operations.

Merge Operation Assembly Sequence

Figure 12:
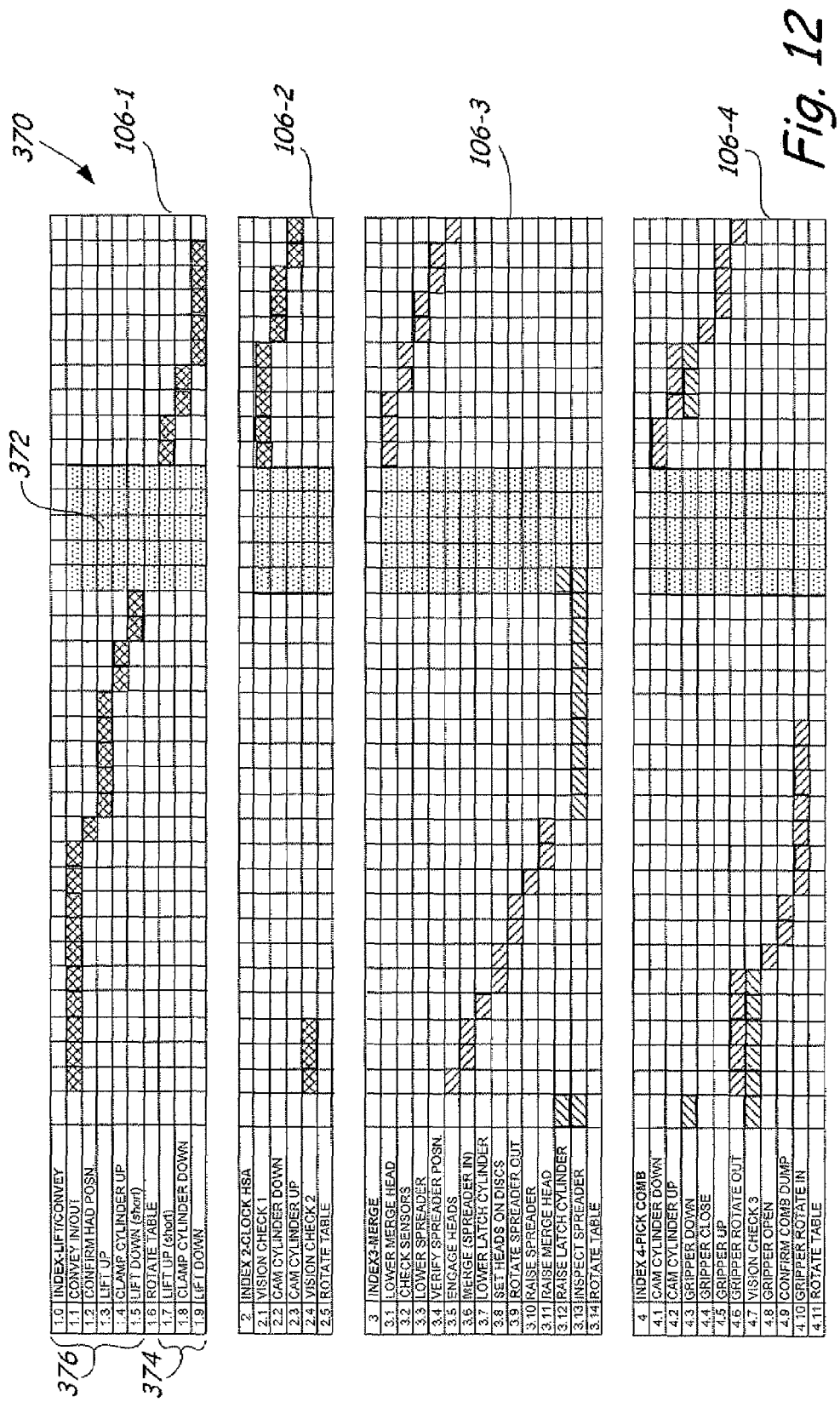
FIG. 12 illustrates an embodiment of a cycle diagram for carousel assembly operations.

FIG. 12 illustrates an operation cycle or period 370 for a carousel merge embodiment including stations 106-1, 106-2, 106-3, 106-4 as previously described. As shown in FIG. 12, during interval or period 372, carousel 102 rotates to position the plurality of assembly nests 122 on carousel 102 proximate to stations 106-1, 106-2, 106-3, 106-4. At station 106-1, a workpiece is unloaded following rotation interval 372 as illustrated by sequence steps 374 and a new workpiece is loaded as illustrated by sequence steps 376. During sequence steps 374, the lift assembly 124 is raised into the assembly nest and the latches or clamps 164-1, 164-2 are released against a spring bias via the latch cam assembly 132 (e.g., which is lowered to release or retract the latches 164-1, 164-2 to unload the workpiece from the assembly nest as illustrated by steps 1.7 and 1.8).

Thereafter the lift assembly 124 is lowered as illustrated by step 1.9 and the completed workpiece is conveyed from station 106-1 and a new workpiece is conveyed to the station 106-1 as illustrated by steps 1.1 and 1.2. The lift assembly 124 is energized to raise the workpiece from the conveyor 110 as illustrated by step 1.3 to load the new workpiece into the assembly nest while the latch cylinder (or latch cam assembly 132) retains the latches or clamps 164-1, 164-2 in a retracted position for load operations. After the workpiece is loaded, the latch cam assembly 132 is raised so that the latches 164-1, 164-2 are biased in the latched position to secure the workpiece in the assembly nest for operation as illustrated by step 1.4. Thereafter the lift assembly 124 is lowered as illustrated by step 1.5 to rotate the carousel during interval 372.

Workpieces loaded at station 106-1 are rotated to station 106-2 via rotation of the carousel 102 during interval 372.

Station 106-2 includes an initial Vision Check I as illustrated by step 2.1 to assure proper alignment. The vision check of step 2.1 uses a machine vision or image to measure or check component alignment. Thereafter, the suspension cam finger 222 and latch cam finger 244 are lowered (via actuators 226, 248 or cylinders) to prealign or bias the positioning or clocking arm 174 to align head suspension assemblies for operation as illustrated in step 2.2. Thereafter the suspension cam finger 222 and latch cam finger 224 are raised as illustrated in step 2.3 and a second Vision Check II is performed as illustrated by step 2.4 to assure premerge alignment of the head suspension assemblies. Following Vision Check II, the carousel 102 rotates to the merge station 106-3 for merge operations as illustrated at step 2.5 during interval 372.

For merge operations at station 106-3, the merge tool (and head) 280 is lowered via lift assembly 282 as illustrated by step 3.1 following the rotation interval 372. Sensors 294, 296 check position of the merge head and components for merge operations as illustrated by step 3.2. Thereafter spreader or fingers 270 are lowered via finger actuator 314 and the merge head 298 rotates to engage and merge the head suspension assemblies. Thereafter yoke cam 322 is lowered via actuator 324 to restrict rotation of the yoke portion 304 as the merge head 298 or spindle 316 rotates to withdraw the merge fingers or spreaders 270 as illustrated by steps 3.7-3.9.

The spreaders or fingers 270 (or block 310) are raised via actuator 314 and the merge head or tool 280 is raised or retracted by the lift assembly 282 as illustrated by steps 3.10 and 3.11. Thereafter in the illustrated embodiment, the yoke cam 322 or cylinder is released as illustrated by step 3.12 to release the yoke portion 304 to the premerged biased position relative to block 310. Thereafter spreaders or merge fingers 270 are inspected and the carousel rotates as illustrated by steps 3.13 and 3.14 during interval 372.

The merged workpiece is rotated to station 106-4 where in the illustrated embodiment, the post-merge cam 342 is lowered via actuator or cylinder 354 to release the positioning or clocking arm 174 of the assembly nest as illustrated by step 4.1. Thereafter the post-merge cam 342 is raised as illustrated by step 4.2, and the gripper head 350 is lowered with the gripper fingers 364 opened as illustrated by step 4.3. The gripper fingers 364 are closed as illustrated by step 4.4 to engage the comb 250. The gripper head 350 is then raised by actuator 362 and rotated with table 360 as illustrated by steps 4.5 and 4.6 to open the gripper fingers 364 to release the comb 250 as illustrated by step 4.8. The gripper head 350 is then rotated to complete the operation cycle for station 106-4. The operating sequence also includes Vision Check III as illustrated by step 4.7 to confirm removal of the comb via a machine vision system.

Merge Assembly Vision

Figure 13:
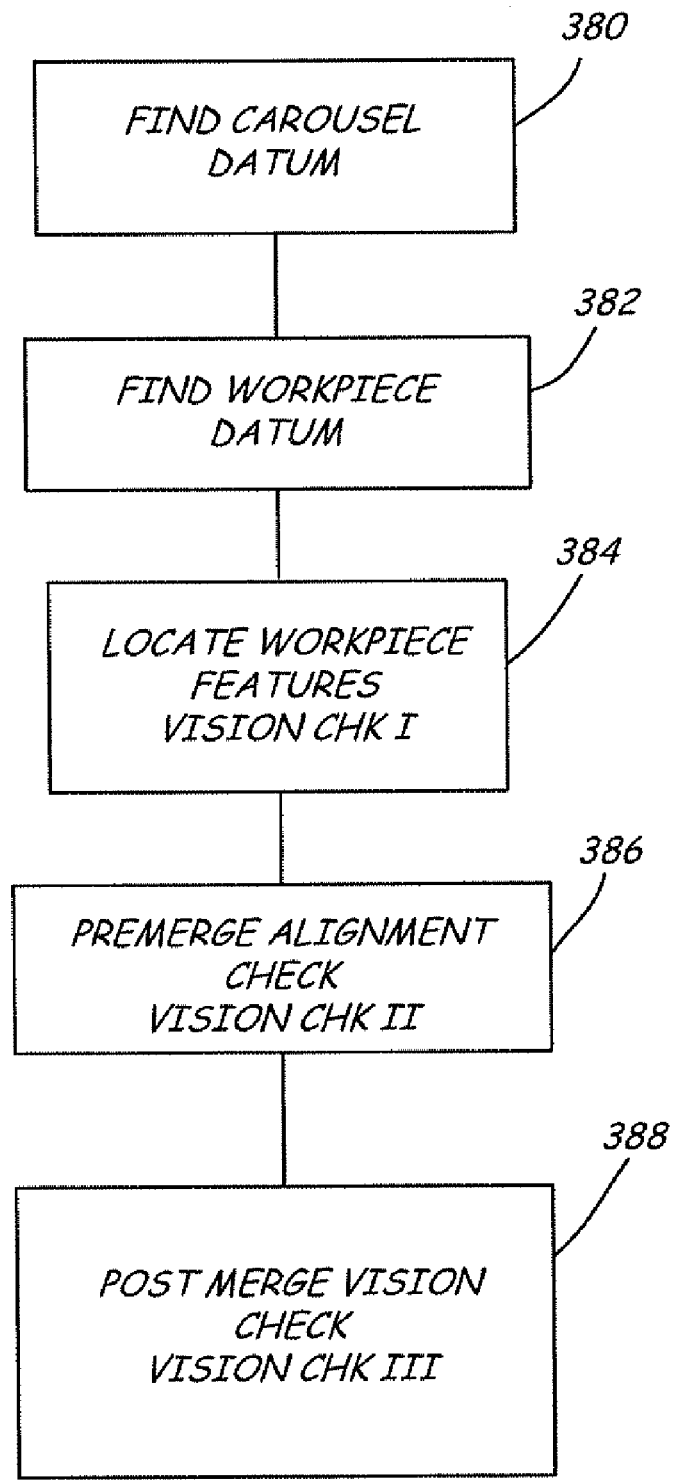
FIG. 13 illustrates a flow chart of an embodiment of a machine vision system for controlling carousel assembly operations.

As previously described, the carousel assembly operation uses a machine vision (in the illustrated embodiment two machine vision cameras are employed) to control merge operations. The machine vision system uses an image of a work zone or area to provide feedback for controlling operation of the carousel merge. The image is processed to locate features of the components or device in the image to measure position or alignment of the components. As shown in FIG. 13, in the illustrated embodiment, the machine vision system measure or locates a carousel datum (roller datum blocks 160) using a search window or region proximate to carousel datum block 160 as illustrated by block 380. The machine vision system also locates an edge of the workpiece or data storage device to determine an orientation of the workpiece as illustrated by block 382. The carousel datum defines the datum of a carousel coordinate system and the workpiece angle defines an angle of the carousel coordinate system for machine vision control of assembly of the workpiece. If the carousel is out of position or shifted, carousel coordinates and search regions of the machine vision system will also shift.

In the illustrated embodiment, prior to merge operations, orientation of the head suspension assembly or assemblies is measured relative to the carousel coordinate system as illustrated by block 384. The orientation is measured relative to a center position of a spindle (or rotation center) of the actuator or E-block and an approximate angle of the head suspension assembly relative to contrasting features on the head suspension assembly to provide a head suspension assembly coordinate system or region to locate features of the head suspension assembly 104 and comb 250. The head suspension assembly coordinate system is used to measure a refined head suspension angle and comb angle relative to the head suspension assembly. The machine vision system also measures a latch angle for latch 274. The measured suspension, comb and latch angle provide a premerge vision check (Vision Check I, step 2.1) for merge operation alignment.

As previously described, suspension and latch cam fingers 222, 244 are actuated to locate the positioning or clocking arm 174 and head suspension assemblies for merge operations. Following actuation of the suspension and latch cam fingers 222, 244, the machine vision system measures position of the positioning or clocking arm 174 and the head suspension assembly (e.g. center or rotation axis) to provide a premerge alignment check (Vision Check II) as illustrated by block 386. Following merge operations, the machine vision system uses a feedback image to verify absence or presence of the comb to verify comb removal (Vision check III) as illustrated by block 388. The comb check looks for a circular darkened area on a white background portion of the image to verify that the comb 250 has been removed. The vision system also measures the merged head suspension assembly position or angle for merge operation alignment control. In one embodiment, the machine vision system measures a read/write connector position for the data storage device. The machine vision system can be adapted or reprogrammed for different workpieces or devices to provide desired operation control.

Demerge Assembly Sequence

Figure 14:
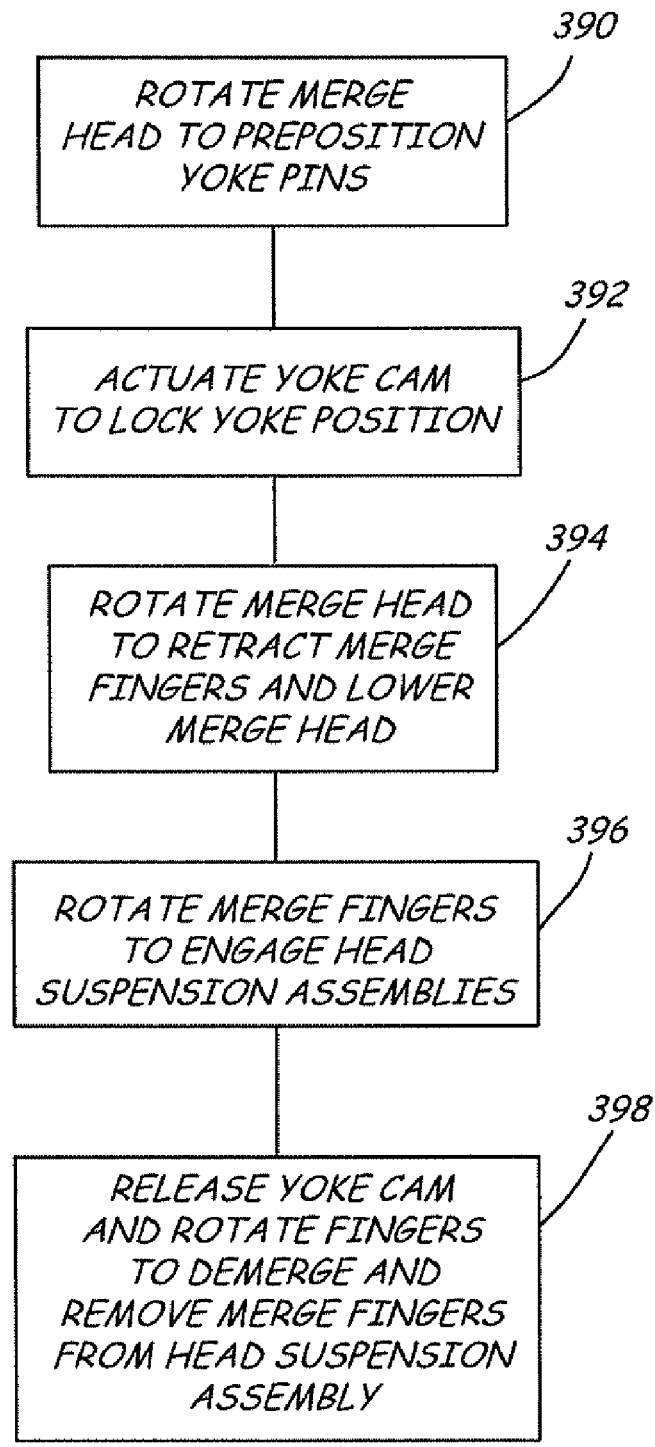
FIG. 14 illustrates a carousel assembly embodiment for demerging or removing merged head suspension assemblies of a data storage device.

The assembly can be used for demerge operation to remove previously assembled head suspension assemblies as illustrated in FIG. 14. For demerge operations, the merge head 298 as is rotated to preposition the yoke pins 308 relative to the merged actuator or E-block 252 (e.g. proximate to yoke arms of a voice coil motor) as illustrated by block 390. Thereafter, the yoke cam 322 is actuated to lock the yoke portion 304 of the merge head 298, as illustrated by block 392, and the fingers or spreader 270 are retracted and the merge tool 280 is lowered as illustrated by block 394. Thereafter the merge fingers or spreaders 270 are rotated via rotation of spindle 316 or merge head 298 as illustrated by block 396 to engage the merged head suspension assemblies. Thereafter the yoke cam 322 is released and the merge fingers or spreaders 270 and merge head 298 rotate to demerge the head suspension assembly or assemblies and remove the merge fingers 270 from the head suspension assemblies as illustrated by block 398. The merge head and tool 280 are raised to remove the merge head and tool from the workpiece or data storage device.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular system, it will be appreciated by those skilled in the art that the teachings of the present invention can be applied to other systems, without departing from the scope and spirit of the present invention.

What is claimed is:

1. An apparatus comprising:
    a carousel rotationally coupled to a base that supports at least one suspension assembly and at least one data storage media; and
    a plurality of assembly stations including a merge station having a merge tool including at least one merge finger or spreader operable to engage the at least one suspension assembly in a first position and movable to a second position to merge the at least one suspension assembly relative to the at least one data storage media and the carousel being rotatable relative to the plurality of assembly stations.

2. The apparatus of claim 1 wherein the plurality of assembly stations include a load/unload station and the carousel is rotatable between the load/unload station and the merge station.

3. The apparatus of claim 2 wherein the plurality of assembly stations include a premerge station between the load/unload station and the merge station and the premerge station includes a pre-merge cam assembly to preposition the at least one suspension assembly for merge operations.

4. The apparatus of claim 2 wherein the plurality of assembly stations include a post-merge station between the merge station and the load/unload station and the post-merge station includes a gripper assembly to remove a shipping comb of the at least one suspension assembly.

5. The apparatus of claim 4 wherein the apparatus includes a vision system that receives a feedback image to verify removal of the shipping comb by the gripper assembly.

6. The apparatus of claim 1 wherein the carousel includes a plurality of assembly nests and the merge tool is compliantly supported between a raised position and a lowered position proximate to the carousel and the merge tool includes at least one pin insertable into a datum socket or opening of the plurality of assembly nests.

7. The apparatus of claim 6 wherein the datum socket or opening is formed between three rollers or bearings to provide an adjustable interface between the merge tool and the plurality of assembly nests.

8. The apparatus of claim 6 wherein the datum socket or opening is formed between opposed spaced rollers or bearings to provide an axially adjustable interface between the merge tool and the plurality of assembly nests.

9. The apparatus of claim 1 wherein the carousel includes a plurality of assembly nests including a plurality of nest pads and the merge tool includes a plurality of nest balls which mate with the plurality of nest pads on the plurality of assembly nests.

10. The apparatus of claim 1 wherein the at least one merge finger or spreader is coupled to a rotatable merge head and the merge head rotates to engage the at least one suspension assembly in the first position and to merge the at least one suspension assembly relative to the at least one data storage media in the second position.

11. The apparatus of claim 10 wherein the merge head includes a yoke portion rotationally coupled to the merge head and spring biased relative to the at least one merge finger or spreader and the apparatus including a yoke latch assembly to restrict rotation of the yoke portion during merge operations.

12. The apparatus of claim 1 wherein the apparatus includes a machine vision system using an image of the at least one suspension assembly prior to or following merge operation.

13. The apparatus of claim 12 wherein the machine vision system measures one of comb angle or position, suspension assembly angle or position, comb presence or latch position.

14. The apparatus of claim 1 wherein the carousel includes at least one assembly nest and the at least one assembly nest comprising a nest body including a plurality of elongate sides enclosing a nest cavity and at least one finger having a first end coupled to one of the plurality of elongate sides and a cantilevered length extending from the first end to a second end located within an area of the enclosed nest cavity of the at least one assembly nest to engage a component of a device securable in the nest cavity.

15. The apparatus of claim 14 wherein the device includes a hydrodynamic spindle assembly and the at least one finger includes a spring biased tip portion positioned to provide a biasing force relative to the spindle assembly.

16. The apparatus of claim 14 wherein the at least one finger is movably coupled relative to the nest body of the at least one assembly nest and is actuatable via a cam assembly to position the at least one finger to engage the component of the device.

17. The apparatus of claim 14 wherein the at least one assembly nest includes a nest plate forming the nest body and the nest plate is removably coupled to the rotatable carousel.

18. The apparatus of claim 1 wherein the plurality of assembly stations includes a premerge station and the premerge station comprises a cam assembly operable to move opposed fingers coupled to a positioning arm to position the at least one suspension assembly for merge operation.

19. The apparatus of claim 1 wherein the carousel includes at least one assembly nest and the at least one assembly nest includes a plurality of datum openings including a rotational datum opening and an axial datum opening spaced from the rotational datum opening and the merge tool includes a first pin insertable into the rotational datum opening and a second pin insertable into the axial datum opening.

20. The apparatus of claim 19 wherein the carousel includes a plurality of assembly nests removably coupled to a carousel plate.

21. The apparatus of claim 19 further comprising:
    a lift operable between a retracted position proximate to a conveyor and a raised position proximate to the carousel to load workpieces from the conveyor onto the carousel and unload workpieces from the carousel to the conveyor.

22. The assembly apparatus of claim 19 wherein the carousel includes plurality of assembly nests and the plurality of assembly nests include opposed latch assemblies operable between a retracted unlatched position to load workpieces and an extended latched position.

23. The apparatus of claim 1 wherein the carousel includes at least one assembly nest and the at least one assembly nest includes a datum opening.

24. The apparatus of claim 19 wherein the first pin is rotatable in the rotational datum opening to align the merge tool.

25. The apparatus of claim 19 wherein the at least one assembly nest includes at least one fixed bearing along a first edge of the at least one assembly nest and at least one spring loaded bearing along a second edge of the at least one assembly nest spaced from the first edge.

26. The apparatus of claim 1 wherein the merge tool includes a motor operable to rotate the at least one merge finger or spreader in a first direction to merge the at least one suspension assembly and operable to rotate the at least one merge finger or spreader in a second opposite direction to remove the at least one merge finger or spreader.

* * * * *